United States Patent

Baran et al.

[15] 3,682,986

[45] Aug. 8, 1972

[54] 17α-ALKANOYLOXY-11β-METHYL-19-NORPREGNA-4,6-DIENE-3,20-DIONES AND THE 6α-CHLORO-19-NORPREGN-4-ENE-3,20-DIONES CORRESPONDING

[72] Inventors: John S. Baran, 9320 Marmora, Morton Grove; Ivar Laos, 8419 East Prairie Road, Skokie, both of Ill.

[22] Filed: June 11, 1970

[21] Appl. No.: 45,592

[52] U.S. Cl..................260/397.45, 260/239.55 R, 260/239.55 C, 260/999

[51] Int. Cl............................................C07c 169/34

[58] Field of Search........Machine Searched Steroids

[56] References Cited

UNITED STATES PATENTS 3,250,792   5/1966   Wettstein et al........260/397.1

*Primary Examiner*—Henry A. French
*Attorney*—John M. Brown, John J. Kolano, Elliot N. Schubert, Lowell C. Bergstedt, Sybil Meloy, Walter C. Ramm and Helmuth A. Wegner

[57] ABSTRACT

17α-Alkanoyloxy-11β-methyl-19-norpregn-4-ene-3,20-diones are converted to the corresponding enol ethers by standard methods and the latter derivatives are, alternatively, oxidized to yield the corresponding 4,6-diene-3,20-diones or are contacted first with an N-chloroamide or N-chloroimide, e.g., N-chlorosuccinimide, then with a strong mineral acid to yield the 6α-chloro compounds. Reaction of the aforementioned 4,6-diene-3,20-diones with a peracid results in the corresponding 6α,7α-epoxy-3-keto-$\Delta^4$ compounds, which are contacted with a hydrogen halide, and the resulting 6β-chloro-7α-hydroxy compounds are dehydrated by conversion first to the 7-methanesulfonate followed by heating with a suitable base to provide the desired 6-chloro-3-keto-$\Delta^{4,6}$ derivatives. The compounds of this invention are unusually potent progestational and estrogen-inhibitory agents.

7 Claims, No Drawings

17α-ALKANOYLOXY-11β-METHYL-19-NORPREGNA-4,6-DIENE-3,20-DIONES AND THE 6α-CHLORO-19-NORPREGN-4-ENE-3,20-DIONES CORRESPONDING

The present invention is concerned with novel progestational and estrogen-inhibitory steroidal derivatives characterized by the following structural formula

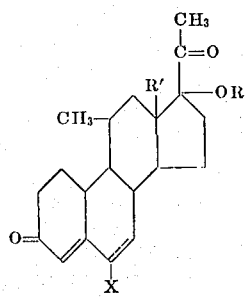

wherein R is an alkanoyl radical possessing one to 10 carbon atoms, e.g. methyl, ethyl, propyl, and the like, R' is a lower alkyl radical of one to four carbon atoms, the dotted line indicates an optional 6(7) double bond, X is α-chloro when the 6(7) linkage is saturated and X is hydrogen or chloro when the 6(7) linkage is unsaturated.

The novel compounds of this invention are conveniently produced by utilizing as starting materials the 3-keto-Δ substances of the following formula

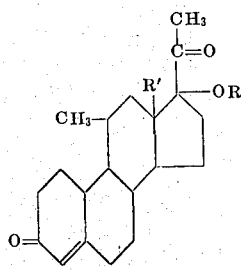

the manufacture of which is described in our copending application 803,077, filed Feb. 27, 1969 now U.S. Pat. No. 3,527,778. In that formula R is as defined hereinbefore.

The 6-dehydro compounds of the present invention are conveniently obtained by oxidation of the corresponding 3,5-diene enol ethers, which are alternatively produced from the corresponding Δ⁴-3-ketones or the $\Delta^{2,5(10)}$ enol ethers. These alternate processes are exemplified by the isomerization and deketalization of 17α-hydroxy-3-methoxy-11β-methyl-19-norpregna-2,5(10)-dien-20-one 20-ethylene ketal by means of p-toluenesulfonic acid to yield 17α-hydroxy-3-methoxy-11β-methyl-19-norpregna-3,5-dien-20-one and the reaction of 17α-acetoxy-11β-methyl-19-norpregn-4-ene-3,20-dione with ethyl orthoformate and p-toluenesulfonic acid to yield 17α-acetoxy-3-ethoxy-11β-methyl-19-norpregna-3,5-dien-20-one. Oxidation of those enol ethers with manganese dioxide in benzene affords 17α-hydroxy-11β-methyl-19-norpregna-4,6-diene-3,20-dione and 17α-acetoxy-11β-methyl-19-norpregna-4,6-diene-3,20-dione, respectively.

A preferred method for the manufacture of the instant 6-chloro-6-dehydro compounds utilizes the corresponding 6-dehydro substances as starting materials. As a specific example, 17α-acetoxy-11β-methyl-19-norpregna-4,6-diene-3,20-dione in methylene chloride is epoxidized, typically with monoperphthalic or m-chloroperbenzoic acid, to afford 17α-acetoxy-6α,7α-epoxy-11β-methyl-19-norpregn-4-ene-3,20-dione. Cleavage of that epoxide by means of hydrogen chloride and dioxane results in 17α-acetoxy-6β-chloro-7α-hydroxy-11β-methyl-19-norpregn-4-ene-3,20-dione. Formation of the 7-methanesulfonate is accomplished by reaction of that chlorohydrin with methanesulfonyl chloride in pyridine at 0° and that ester is heated in dimethylformamide with sodium acetate at about 80° to afford 17α-acetoxy-6-chloro-11β-methyl-19-norpregna-4,6-diene-3,20-dione.

The instant 6α-chloro derivatives are conveniently obtained by treating the aforementioned 3-enol ethers with hypochlorous acid or a reagent capable of liberating that acid. Other suitable reagents include alkali metal salts of hypochlorous acid or N-chloroamides or N-chloroimides, e.g. N-chlorosuccinimide, in the presence of sodium acetate, acetic acid and water, preferably at temperatures near 0° for periods up to several hours. The hypochlorous acid treatment provides the corresponding 6β-chloro-3-keto-Δ⁴ derivative, which upon subsequent strong mineral acid epimerization under anhydrous conditions yields the desired 6α-chloro derivative. Preferably, acid treatment is employed upon the compound dissolved in an organic acid such as acetic acid. Suitable strong mineral acids include dry hydrogen chloride. The reaction time can be in the range of several hours. Preferred temperatures are between 5° and 20° C.

The instant compound wherein the 13β-alkyl group contains more than one carbon atom are obtained as dl-mixtures. Resolution of those dl-compounds to afford the individual d and l enantiomorphs is conveniently effected by esterification of an hydroxy group with a dibasic acid anhydride such as succinic or phthalic anhydride to afford the corresponding acid ester, which is resolved by means of an optically active amine such as brucine, morphine, quinine, quinidine, strychnine, etc.

The compounds of this invention are useful as a result of their valuable pharmacological properties. As indicated hereinbefore they are potent progestational and estrogen-inhibitory agents.

The assay used for determination of progestational activity is a modification of that described by Clauberg, C. Zentr. Gynakol., 54, 2757 (1930) and later in Hormone Assay, C. W. Emmens, Academic Press, page 422 (1950). The modified assay is described as follows:

Female rats weighing about 1 kg. are primed daily for 6 days with 5 mcg. subcutaneous injections of estradiol (17β). Starting on the day following the last priming injection the test compound, dissolved or suspended in corn oil, is administered subcutaneously each day for a period of 5 days. A control group of animals is treated with corn oil alone. On the day after the last treatment, the animals are sacrificed; a segment of the uterus is taken for histological examination and the degree of arborization of the endometrial glands is graded by the method described by McPhail, M. K., J. Physiol., 83, 145 (1934). The progestational responses are rated on a scale from 1 to 4, a response of at least 2 being required for a compound to be rated active.

The estrogen-inhibitory property of the compounds of this invention is detected by the assay described by Edgren and Calhoun, Proc. Soc. Exp. Biol. Med., 94, 537 (1957), the details of which assay are as follows:

Groups of 8–10 immature female mice are injected once daily for a period of 3 days with 0.1 ml. of a corn oil solution containing 0.1 mcg. of estrone together with one-third of the selected dose of the test compound. Twenty-four hours after the final injection the animals are sacrificed and their uteri are removed, cleaned and weighed. The uterine weights are compared with those of a similar group of control animals receiving injections of corn oil containing the same dose of estrone alone. A compound is designated active if it produces a uterine response significantly smaller (P $\leq$ 0.01) than control values. Potency is expressed in terms of percentage of the activity of the standard, i.e. progesterone.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees Centigrade (°C.) Quantities of materials are expressed in parts by weight unless otherwise noted.

EXAMPLE 1

To a solution of 2,3 parts of 17α-acetoxy-11β-methyl-19-norpregn-4-ene-3,20-dione in 22 parts of dioxane is added 0.18 part of ethanol, 2.12 parts of ethyl orthoformate and a solution of 0.11 part of p-toluenesulfonic acid monohydrate in 1.8 parts of dioxane. The resulting reaction mixture is stirred at room temperature for about 1 ¼ hours, then is neutralized by the addition of 1.8 parts of pyridine. The mixture is then concentrated under reduced pressure until crystallization of the produce commences. Benzene is added and the resulting solution is washed several times with water, then dried over anhydrous sodium sulfate and concentrated to dryness under reduced pressure. The resulting crude product is azeotropically distilled with xylene to remove traces of ethyl orthoformate, thus affording crystalline 17α-acetoxy-3-ethoxy-11β-methyl-19-norpregna-3,5-dien-20-one, characterized by nuclear magnetic resonance peaks at about 44, 58, 64, 71, 78, 85, 122, 125, 217, 224, 231, 238 and 316 cycles per second.

EXAMPLE 2

The substitution of an equivalent quantity of 17α-n-butyryloxy-11β-methyl-19-norpregn-4-ene-3,20-dione in the procedure of Example 1 results in 17α-n-butyryloxy-3-ethoxy-11β-methyl-19-norpregna-3,5-dien-20-one.

EXAMPLE 3

To a solution of 2.4 parts of 17α-acetoxy-3-ethoxy-11β-methyl-19-norpregna-3,5-dien-20-one in 140 parts of benzene is added 12 parts of manganese dioxide and the resulting reaction mixture is stirred at room temperature for about 45 minutes. The oxidant is then removed by filtration and the filtrate is concentrated to dryness under reduced pressure. The resulting crude product is purified by adsorption on a silica gel chromatographic column followed by elution with 7 percent ethyl acetate in benzene and purification of the eluted fraction by recrystallization from acetone-hexane, thus affording 17α-acetoxy-11β-methyl-19-norpregna-4,6-diene-3,20-dione, melting at about 206°–208°. It is characterized further by an ultraviolet absorption maximum at about 282.5 millimicrons with a molecular extinction coefficient of about 25,300 and also by the following structural formula

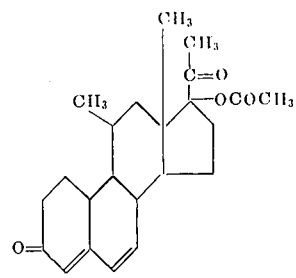

EXAMPLE 4

When an equivalent quantity of 17α-n-butyryloxy-3-ethoxy-11β-methyl-19-norpregna-3,5-dien-20-one is substituted in the procedure of Example 3, there is obtained 17α-n-butyryloxy-11β-methyl-19-norpregna-4,6-diene-3,20-dione.

EXAMPLE 5

A mixture containing 5 parts of 17α-acetoxy-3-ethoxy-11β-methyl-19-norpregna-3,5-dien-20-one, 3 parts of anhydrous sodium acetate, 80 parts of acetone and 30 parts of water is cooled to 0°–5°, at the end of which time 6.4 parts of N-chlorosuccinimide and 2 parts of glacial acetic acid are added. The mixture is stirred for 30 minutes at a temperature of 0°–5°, then is diluted with 300 parts of water and stored at 0°–5° for about 16 hours. The precipitate which forms is collected by filtration, washed on the filter with water and dried in air, then purified by recrystallization from acetone to yield 17α-acetoxy-6β-chloro-11β-methyl-19-norpregn-4-ene-3,20-dione.

A slow stream of dry hydrogen chloride is introduced into a suspension of 3 parts of the aforementioned product and 50 parts of glacial acetic acid while the temperature is maintained below 10°. After about 1 hour the reaction mixture is poured into 100 parts of water containing 35 parts of potassium acetate and the resulting mixture is cooled. The precipitate which forms is collected by filtration, washed with water, then dried and recrystallized from a mixture of acetone and hexane to yield 17α-acetoxy-6α-chloro-11β-methyl-19-norpregn-4-ene-3,20-dione, characterized by infrared absorption maxima in chloroform at about 5.76, 5.82, 5.94 and 6.18 microns and also by the following structural formula

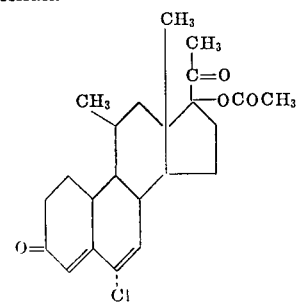

EXAMPLE 6

When an equivalent quantity of 17α-n-butyryloxy-3-ethoxy-11β-methyl-19-norpregna-3,5-dien-20-one is substituted in the successive processes of Example 5, there are obtained 17α-n-butyryloxy-6β-chloro-11β-methyl-19-norpregn-4-ene-3,20-dione and 17α-n-butyryloxy-6α-chloro-11β-methyl-19-norpregn-4-ene-3,20-dione.

EXAMPLE 7

A solution of 2.5 parts of 17α-acetoxy-11β-methyl-19-norpregna-4,6-diene-3,20-dione in about 200 parts of methylene chloride is treated with 125 parts by volume of a 5 percent solution of monoperphthalic acid in ether and the resulting mixture is kept at room temperature for about 24 hours, then is washed successively with 5 percent aqueous sodium carbonate and water, dried over anhydrous sodium sulfate and concentrated to the point of incipient crystallization. That mixture is then cooled until crystallization is complete and the resulting precipitate is collected by filtration and dried in air. Purification of that product by chromatography on silica gel affords 17α-acetoxy-11β-methyl-6α,7α-epoxy-19-norpregn-4-ene-3,20-dione, which displays an ultraviolet absorption maximum at about 241 millimicrons with a molecular extinction coefficient of about 15,400.

EXAMPLE 8

Method A

A solution of 2 parts of the above prepared 6α,7α-epoxy compound in 105 parts of acetic acid is treated with 6 parts of concentrated hydrochloric acid and the resulting mixture is kept at room temperature for about 6 hours. The product which precipitates upon dilution with water is collected by filtration, then purified by recrystallization from acetone-hexane, thus affording 17α-acetoxy-6-chloro-11β-methyl-19-norpregna-4,6-diene-3,20-dione, melting at about 180°–182° and characterized also by infrared absorption maxima in chloroform at about 5.78, 5.83, 6.02, 6.23, and 6.30 microns. It displays an ultraviolet absorption maximum at about 282.5 millimicrons with a molecular extinction coefficient of about 20,900 and is represented by the following structural formula

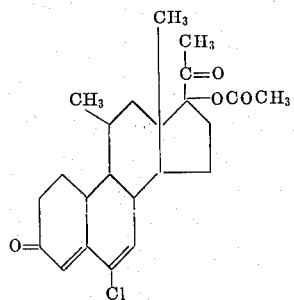

Method B

A solution containing 1 part of 17α-acetoxy-11β-methyl-6α,7α-epoxy-19-norpregn-4-ene-3,20-dione dissolved in 30 parts by volume of a dioxane solution 1 N in hydrogen chloride is stored at room temperature for about 30 minutes, then is poured carefully into 300 parts by volume of a mixture of ice and water containing 8.4 parts of sodium bicarbonate. The resulting aqueous mixture is extracted with benzene and the benzene layer is separated, washed several times with water, then dried over anhydrous sodium sulfate and stripped of solvent under reduced pressure. The resulting product is 17α-acetoxy-6β-chloro-7β-hydroxypregn-4-ene-3,20-dione, obtained as a solid foam.

The latter chlorohydrin is dissolved in 12 parts of pyridine and the resulting mixture is placed in a nitrogen atmosphere and cooled to 0°–5°. To that mixture is then added 0.9 part by volume of methane-sulfonyl chloride and the reaction mixture is kept at 0°–5° for about 18 hours. At the end of that time it is poured into a mixture of ice and water with stirring and the precipitate which forms is collected by filtration and washed on the filter with water, thus affording 17α-acetoxy-6β-chloro-7α-methanesulfonyloxypregn-4-ene-3,20-dione.

A mixture containing 1 part of the latter mesylate, 3.6 parts of anhydrous sodium acetate and 18 parts of dimethyl formamide is stirred in a nitrogen atmosphere at 80°–90° for about 75 minutes, then is cooled and poured into a mixture of ice and water. The precipitate which forms is collected by filtration, washed with water and purified by chromatography on silica gel. The 2 percent ethyl acetate in benzene eluates are combined, then distilled to dryness, and the resulting solid product is purified by recrystallization from acetone-hexane to afford 17α-acetoxy-6-chloro-11β-methyl-19-norpregna-4,6-diene-3,20-dione, identical with the product of Method A.

EXAMPLE 9

When an equivalent quantity of 17α-n-butyryloxy-11β-methyl-19-norpregna-4,6-diene-3,20-dione is substituted in the successive processes of Example 7, there are obtained 17α-n-butyryloxy-11β-methyl-6α,7α-epoxy-19-norpregn-4-ene-3,20-dione and 17α-n-butyryloxy-6-chloro-11β-methyl-19-norpregna-4,6-diene-3,20-dione.

What is claimed is:

1. A compound of the formula

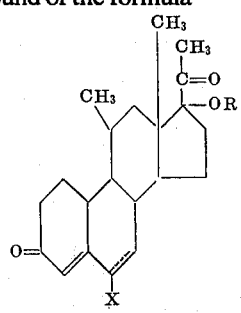

wherein R represents an alkanoyl radical of one to 10 carbon atoms, the dotted line represents an optional 6(7) double bond, X is α-chloro when the 6(7) linkage is saturated and X is hydrogen or chloro when the 6(7) linkage is unsaturated.

2. A compound of the formula

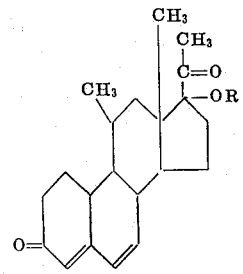

wherein R represents an alkanoyl radical of one to 10 carbon atoms.

3. A compound of the formula

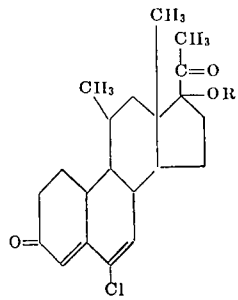

wherein R represents an alkanoyl radical of one to 10 carbon atoms.

4. A compound of the formula

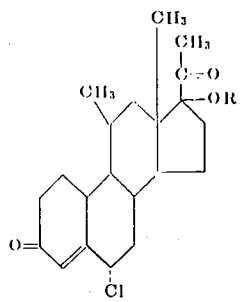

wherein R represents an alkanoyl radical of one to 10 carbon atoms.

5. The compound according to claim 1 which is 17α-acetoxy-11β-methyl-19-norpregna-4,6-diene-3,20-dione.

6. The compound according to claim 1 which is 17α-acetoxy-6α-chloro-11β-methyl-19-norpregn-4-ene-3,20-dione.

7. The compound according to claim 1 which is 17α-acetoxy-6-chloro-11β-methyl-19-norpregna-4,6-diene-3,20-dione.

* * * * *